Nov. 24, 1953   M. SEARS   2,659,915
PORTABLE DEVICE FOR SCRUBBING AND RINSING
AUTOMOBILE BODIES AND THE LIKE
Filed Oct. 28, 1946   5 Sheets-Sheet 1

INVENTOR.
MELVILLE SEARS.
BY
ATTORNEY.

INVENTOR.
MELVILLE SEARS.
BY Percy Freeman
ATTORNEY.

INVENTOR.
MELVILLE SEARS.
BY Percy Freeman
ATTORNEY.

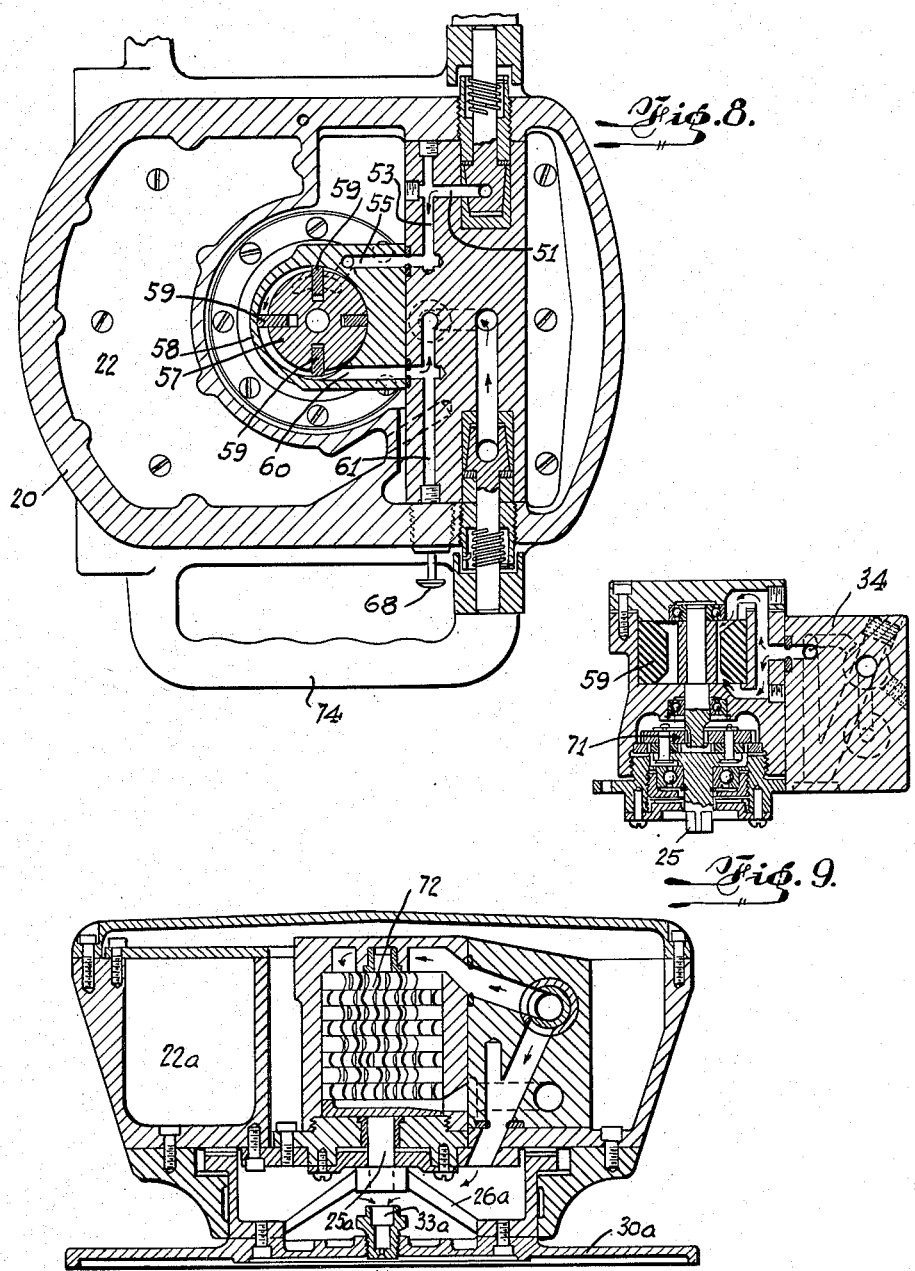

Nov. 24, 1953 M. SEARS 2,659,915
PORTABLE DEVICE FOR SCRUBBING AND RINSING
AUTOMOBILE BODIES AND THE LIKE
Filed Oct. 28, 1946 5 Sheets-Sheet 5
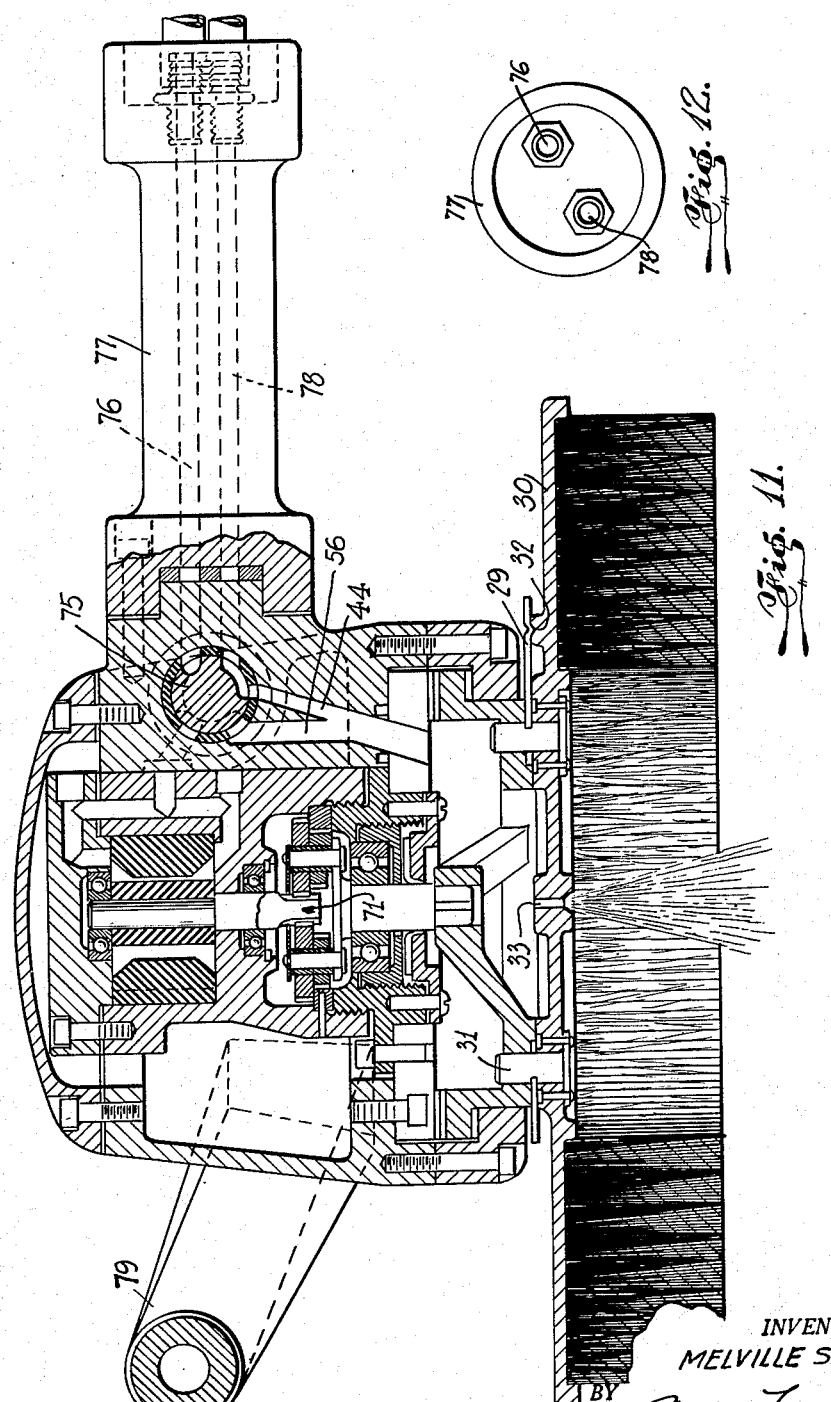
INVENTOR.
MELVILLE SEARS.
BY
ATTORNEY.

Patented Nov. 24, 1953

2,659,915

UNITED STATES PATENT OFFICE 2,659,915

PORTABLE DEVICE FOR SCRUBBING AND RINSING AUTOMOBILE BODIES AND THE LIKE

Melville Sears, Ridgefield Park, N. J., assignor to Craftmaster Manufacturing Co., Inc., Ashtabula, Ohio, a corporation of Ohio Application October 28, 1946, Serial No. 706,146

5 Claims. (Cl. 15—29)

This invention relates to new and useful improvements in washing machines and has especial reference to machines which can be held in the hand by the operator while washing, soaping, and rinsing automobile bodies.

In the ordinary operation of washing automobiles, it is the custom to wet the car with a hose, then apply soap or other cleansing medium by hand, after which the lather is rinsed off by hose, and later on, the car may be polished. All these operations are by hand and require separate appliances and tools. An object of the invention is to save a great deal of time by combining in one device means for washing, soaping and rinsing the car or surface while the device is held in the hands of the operator.

A further object is to provide a device in which, while held in the hand, the device can be manipulated by the fingers of the operator to apply a washing jet, stream or spray of water, a mixture of soap and water, to rotate a scrubbing brush, and then to apply rinsing water alone; to provide a device which by simple finger manipulation may be made to change from one of these operations to any of the others and thus to save time and require but little effort on the part of the operator.

A still further object is to provide a device which can, while being held in the hands of the operator, throw a strong jet of water at the car or other surface to be cleaned, apply a mixture of soap and water, and wash the car, rinse it off, saving a great amount of time and effort in performing the entire operation.

Further and more specific objects, features, and advantages will more clearly appear from the detailed specification hereinafter set forth especially when taken in connection with the accompanying drawings which illustrate a present preferred form which the invention may assume and which forms part of the specification.

In brief and general terms the invention concerns the provision of a casing provided with hand grips and within which is housed an air or water motor as well as, generally, a soap reservoir. The casing is also provided with a valve block containing rotatable or movable valves and various passages whereby water or air from outside the machine may be introduced by operation of two finger pieces on the casing within easy reach of the hands of the operator while he is grasping the device in his hands and a push button to operate a valve to introduce soap thereinto also operable by a finger of the hand.

The water may be introduced into the device and issue through a nozzle merely for the purpose of wetting the car surface or it may be so introduced as to operate a motor to rotate a brush or mop and also mix with soap to form lather to be applied to the car surface either while the brush is quiescent or in motion as the desire may be. On the other hand, the motor may be operated by air instead of water, in which case, the exhaust from the air motor is employed to assist in withdrawing soap from the soap reservoir and to add velocity to the water. A further form of the device is one in which the car is wetted and rinsed by outside means in which case, the hand device merely employs air and soap to mix with each other to form lather and the air to drive the brush motor. This latter form is especially adaptable in auto laundries where cars may be driven within stands containing water spray nozzles all around, which can be turned on to thoroughly wet the car before the particular hand tool is brought into play, and to rinse after rubbing in the lather with the hand tool.

In the operation of the preferred form of the device which is a portable self-contained unit, it is desired to perform the following operations:

1. To throw with great force, a finely divided quantity of water at the object or machine to be washed, such as an automobile, truck, or bus, etc.;

2. To apply a mixture of soap, lather, and water to the object being washed and by means of a revolving brush, to rub the soap lather into the surface being washed and scrub the same, said brush being power-driven by a motor driven either by air or water;

3. To throw a rinsing stream of water at the object being washed, to rinse off the soap lather and film.

The machine contains motive power to rotate the brush plate, such as an air motor, geared planetary reducer to reduce motor speed, and a rotating brush plate. In addition, it includes a three- or four-way air-valve and a two or three way water valve. It also includes in one form a built-in soap chamber to hold enough soap for several cars, and a mixing nozzle and a spray nozzle.

In the operation of this preferred form an air motor is used and the following steps may be employed:

1. *Washing a car.*—The first thing necessary is to wet it thoroughly, or in the case of muddy vehicles, to wet and rub off the mud before applying soap.

*a.* For cars not very muddy, and not requiring a rubbing off of the mud, the air going through the air hose to the air valve and thence led to mixing nozzle, mixes there with the water going through the water valve. It leaves the spray nozzle at high velocity and is directed at the car surface. The spray nozzle is located in the center of the brush plate. In this case, the brush plate does not rotate, since the operator will hold the unit several feet from the car or other object being washed and direct the stream at it.

b. In the case of the very muddy car that requires some rubbing as part of the wetting down, the air is directed through another port of the air valve, to the air motor, and the exhaust air from the motor is led to the mixing nozzle, thence to the spray nozzle, and then to the car. The air entering the air motor drives the revolving brush through the planetary reducing transmission and the rotating brush is rubbed over the surface to be wetted and rubbed. This takes place with the water flowing from the hose, through the water valve to a mixing nozzle, where it mixes with the air. The rotation of the brush does mechanically what the operator would have had to do manually, rub the dirt off.

2. *Soaping of the car.*—Air is sent through the air hose, to air valve in machine and ported to air motor, thence exhaust air goes to mixing nozzle. Air passing through sucks soap out of soap chamber when the soap valve is operated.

The water valve is ported for a minor flow, just enough to mix with soap for maximum lathering and cleansing effect. Since air at line pressure goes to the motor, the brush rotates and soap issues from spray nozzle simultaneously. The rotating brush is applied to the car with a gentle pressure and moved about thus cleaning the car quickly.

3. *Rinsing.*—Air goes through air valve direct to mixing nozzle. Water turned on full goes to mixing nozzle. Both issue forth from spray nozzle at high velocity. Operator stands several feet away from the car and directs stream against it.

In another form of the invention for use in auto laundries the device is a portable air-motored unit where the sole function of the air motor is to rotate the brush head and feed soap to the car. This is in the case of laundries where the wetting and rinsing are done by revolving clusters of spray nozzles permanently mounted on pipe frames between which the vehicle is driven prior to treatment.

The present preferred forms which the invention may assume are shown in the drawings, of which:

Fig. 8 is a horizontal section taken on the line 8—8 of Fig. 2, showing the rotor, mixing block and interconnected passages.

Fig. 9 is a vertical cross section taken through the rotor and the mixing block.

Fig. 10 is a typical section through a form of unit in which the rotor is driven by a water turbine instead of an air motor.

Fig. 11 is a central vertical section through a form of unit especially adapted for use in auto laundries.

Fig. 12 is an end elevation of the handle for such a model showing the air and soap pipes which are housed in the handle.

Figure 1:
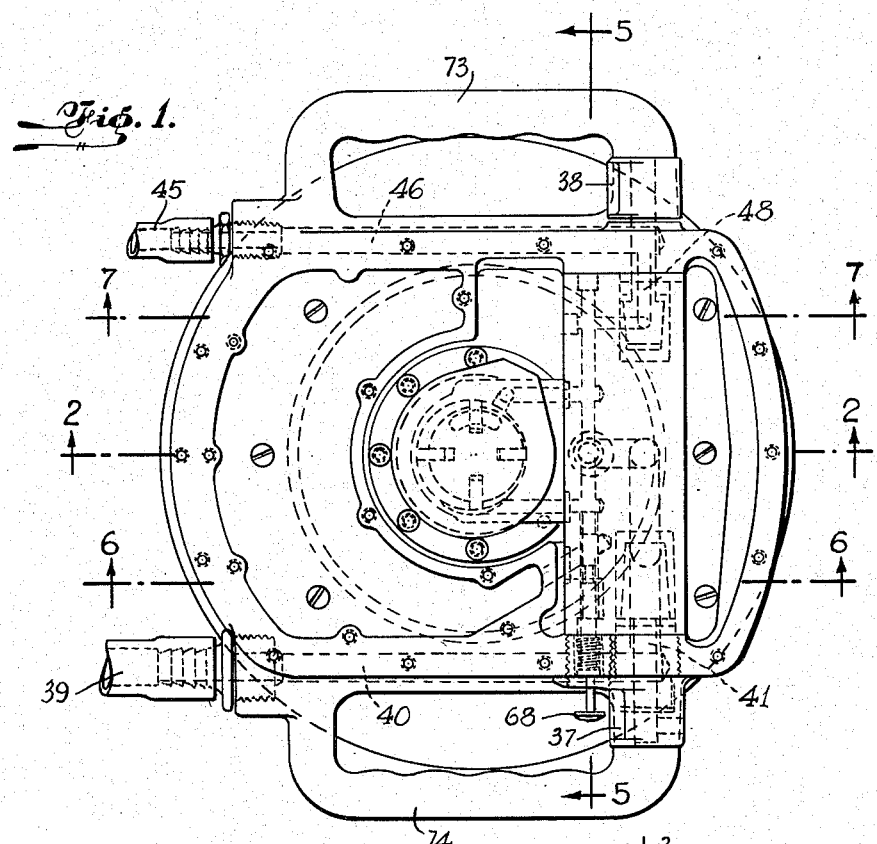
Fig. 1 is a plan view with housing and soap chamber covers removed, of a representative form in which the moving parts including the brush are driven by an air motor.
Figure 2:
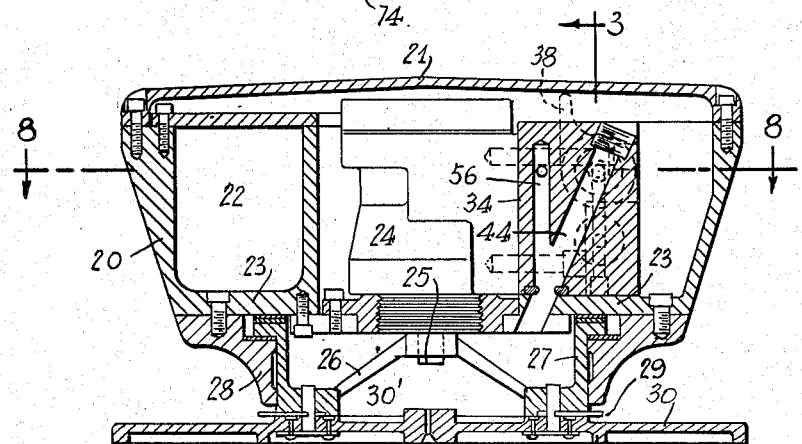
Fig. 2 is a vertical central section taken on the line 2—2 of Fig. 1, showing the water and soap passages.

The present preferred embodiments of the invention are shown in the drawings in which Figs. 1 to 9 inclusive, show various views of a form of device in which air drives the brush motor, and water is mixed with the soap and air.

The general main parts of this form comprise a hollow casing 20 having a cover 21, a soap reservoir chamber 22, the casing having a bottom wall 23 to which is screwed a motor unit 24 in the form of an air motor, the shaft of which, 25, is connected to a spider 26 driving an annular ring 27 sealed rotatively with a closure ring 28 screwed to the bottom plate 23. To the lower face of the spider is detachably fastened by means of the usual key slotted ring plate 29, a brush plate 30 having pins 31 extending up through holes in the bottom of the spider and locked in the well-known manner by the ring-lock plate 29, the handles of which can be moved (see Fig. 11) to lock and to release the pins, and which handles having dependent lugs 32 to rest in dents in the top of the brush plate 30 to hold the handles in locked position.

Figure 3:
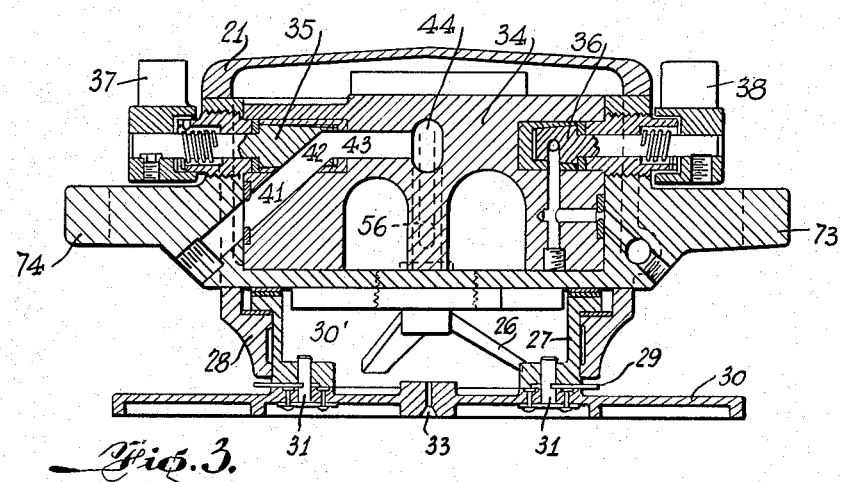
Fig. 3 is a vertical transverse section taken on the line 3—3 of Fig. 2, showing the mixing block and passages therein.
Figure 4:
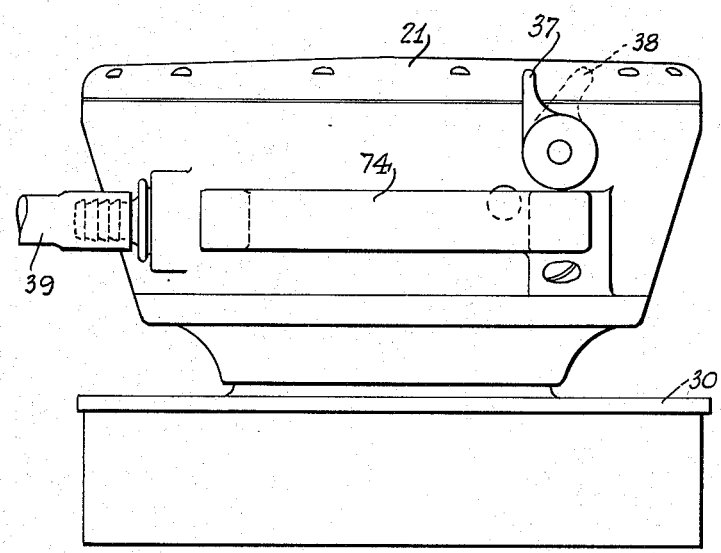
Fig. 4 is a side elevation of the unit as seen from the bottom of Fig. 1.
Figure 5:
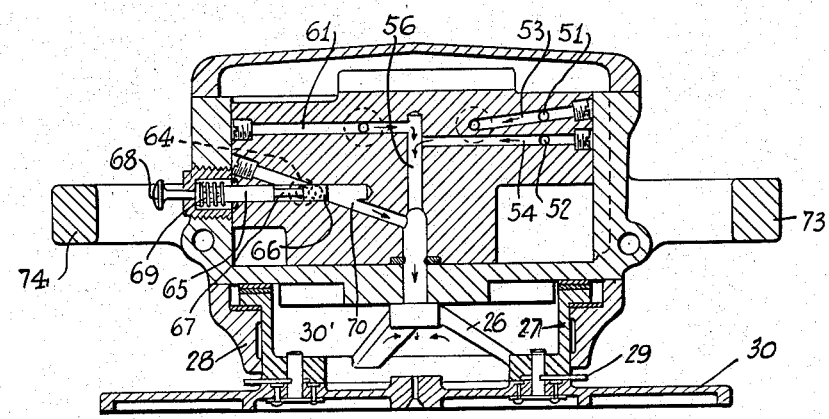
Fig. 5 is a vertical cross section taken on the line 5—5 of Fig. 1, indicating a longitudinal section through the mixing block.
Figure 6:
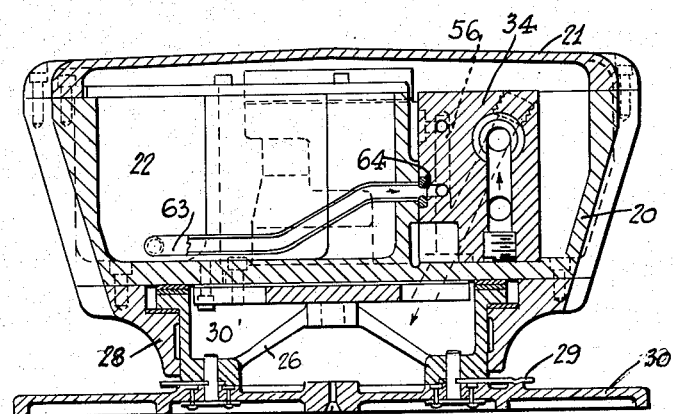
Fig. 6 is a vertical section taken on the line 6—6 of Fig. 1, showing the connection between the mixing block and the soap chamber.
Figure 7:
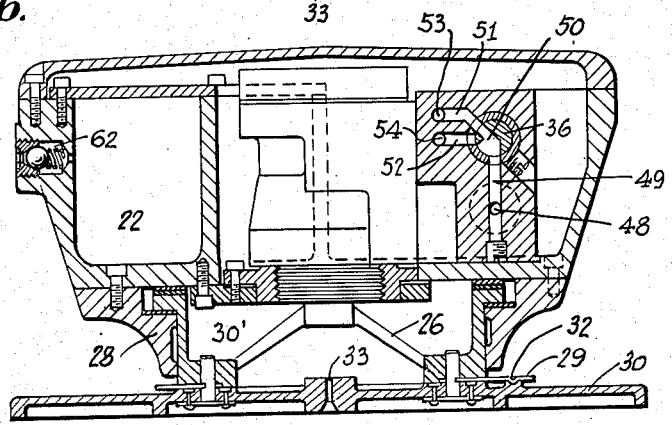
Fig. 7 is a vertical section taken on the line 7—7 of Fig. 1, showing the air passages to the motor and to the passage leading to the main nozzle.

The brush plate 30 has a nozzle or spray orifice 33. It is seen that the space 30' above the brush plate 30 forms a sort of mixing chamber in which air, soap and water may freely mix before being projected through the nozzle 33. The spider 26 rotating relative to the bottom wall 23 and the bottom of the motor unit 24 acts to agitate the mixture. In the casing 20, alongside of the motor housing 24, is fastened a valve block 34 in one end of which is disposed a water valve 35, (Fig. 3) and in the other end of which is disposed an air valve 36. As shown in Fig. 3, the water valve can be rotated by a finger lever 37 and the air valve can be rotated by means of a finger lever 38.

The water enters the device by means of a water hose 39 leading to horizontal passage 40 (Fig. 1), the inner end of which leads to an upwardly inclined passage 41 (Figs. 1 and 3) which leads to a similar passage 42 in the water valve 35. This latter passage communicates with a passage 43 in the block 34 and this in turn leads to a downwardly sloping passage 44 which opens into the top of the mixing chamber 30'. Thus the water can be introduced into the mixing chamber by manipulating the finger lever 37 and the degree or amount of water permitted to enter will be determined by the degree to which the valve 35 is opened.

The flow of the air through the device is as follows:

When the finger lever 38 is moved, the air valve is turned. The air enters the device through air hose 45 connecting to horizontal passage 46, which leads to horizontal, longitudinal passage 48, and this in turn leads to vertical passage 49 (Fig. 7), leading to the air valve 36. This valve has a transverse passage 50 by means of which the air can be connected to either of two passages 51 and 52, extending across the block 34. These passages 51 and 52 connect respectively to two longitudinal passages 53 and 54 (Fig. 5) in the block 34. The upper longitudinal passage 53 connects with a passage 55 extending into the air motor 24. The lower passage 54 leads directly to a downwardly sloped passage 56 (Fig. 2) which communicates with the lower end of the water passage 44 previously mentioned. Thus air may be caused to flow directly into contact with the water without going through the motor, or it can go through the motor first and then through the passage 56 to contact with the water. Whether it does one or the other depends upon the position of the air valve 36. In the position of the valve shown in Fig. 7, the air goes to the motor first, but in the other position thereof, it will go directly into contact with the water without driving the motor. When the air goes to the motor 24, as described, it passes through it in the usual manner. The motor has a rotor 57 in the cylinder 58, with the usual laterally movable pistons 59. The operation of this well-known device need not further be described. As the air leaves the motor, it passes through passage 60 (Fig. 8), and thence to longitudinal passage 61 (Figs. 8 and 5) which leads to the vertical air passage 56 above mentioned.

The passage of the soap in liquid form through the device is as follows:

The reservoir 22 has in its side wall a check valve 62 (Fig. 7) so that when suction is applied to soap by air or water, the check valve will relieve the vacuum which would otherwise be created. The soap is pulled out of the reservoir through pipe 63 (Fig. 6) which connects with a small passage 64 in the block 34. This connects to a longitudinal passage 65 in the block controlled by a slide valve 66 having a central reduced portion 67 and this reduced portion, when the valve knob 68 is pressed against the resistance of spring 69, opens passage 64 to a downwardly sloping passage 70 leading to the lower portion of the water passage 44 previously mentioned. It is, therefore, perfectly clear that when the soap valve 66 is opened, soap will be sucked out of the soap chamber by the sucking action of the air and/or water rushing down the passages 44 and 56 past the opening thereinto of the soap passage 70. In Figs. 9 and 11, the motors employed are connected to the brush plate through the intermediary of planetary reduction gearing of any well-known form and merely designated by the numeral 71 (Fig. 9). In the form shown in Fig. 10, there is illustrated a device in which a water turbine is employed of any well-known design and designated by the numeral 72, alternate sets of the blades thereof being fixed to the housing of the motor and the others to the rotating shaft 25a.

In the preferred form, the casing is provided with two hand grips 73 and 74 on opposite sides thereof (Fig. 1), whereby the operator can grasp the device firmly. It will be seen from this figure that his fingers will naturally lie close to the finger levers 37 and 38 and the soap push button knob 68 so that he can establish complete control over the operation of the device without taking his hands off the grips.

In the device shown in Figs. 11 and 12, the form is adapted for use where only air and soap are required of it. The water to wet, wash, and rinse may be supplied from other sources, as noted before. This device is quite similar in most of its structure, but has no water valve and the air valve 75 is different, controlling passage of air from passage 76 in the elongated handle 77 through the valve into the motor and back through the valve into the passage at the same time that soap is passing through the passage 78 in the handle 77 through the valve down the passage 44. By turning the valve one way or the other, these operations are effected and, of course, by arranging the valve passages as is well-known and as may be desired, different connections may be achieved. This form has a hand grip 79 so that as in the other form, the operator need not remove his hands from the device to make his changes and connections but in this case, the soap and air connections are altered by merely operating one finger lever (not shown) connected to the valve 75.

It is thus obvious that in the use of this device, the operator grasps the device in his hands and never has to let go of it. Generally, he first manipulates the water valve to pass a full flow of water through the passage and nozzle on to the car body to thoroughly wet it. Then he may keep the water at full strength or reduce its flow by adjusting the valve and at the same time will open the air valve to introduce air to the motor while pressing the soap valve knob allowing soap to be sucked out of the soap chamber to mingle with the air and water while the brush is rotating to apply soap and thoroughly rub it in as he passes the brush over the surface of the car. By using a smaller force of water, he can create, through the nozzle, a softer spray to make more effective the mixing of air, water and soap which mix together in the chamber just above the brush plate. After the soaping is completed, he can then turn on the water again alone and wash or rinse the soaped surface either by full power or reduced power, as he may desire. In the form of Fig. 11, the water is applied from other sources but the soap and air are mixed and the car is washed in the same manner by manipulating the single air and soap valve shown. In this form also, the rinsing is achieved by the outside source, as stated.

While the invention has been described in detail and with respect to a present preferred form which the invention may assume, it is not to be limited to such details and forms since many changes and modifications may be made in the invention without departing from the spirit and scope of the invention in its broadest aspects. Hence, it is desired to cover any and all forms and modifications which may come within the language or scope of any one or more of the appended claims.

Having thus described my invention, what I claim as new and desire to secure by Letters Patent, is:

1. A washing device which comprises a casing, means to grip it in the hands of an operator, a water valve therein, a soap valve therein, and an air valve therein, means finger-manipulable connected to said valves whereby they may be operated while the hands grasp the casing, a rotatable brush plate, a fluid motor operatively connected to said plate and to said casing means, a nozzle in said plate, means including said water valve to admit a stream of water to said nozzle, means including said soap valve to admit soap liquid into contact with the stream of water to be mixed therewith, means including said air valve to admit air to said motor, means to exhaust air from the motor into contact with the water and soap stream, and means including said air valve to admit air directly into contact with the water and soap stream by-passing the motor.

2. A washing device which comprises a casing, a fluid motor in said casing, a soap chamber therein having a passage leading therefrom, a rotatable brush unit operatively connected to said motor, a nozzle in said brush unit, a mixing chamber bounded by the brush unit and the motor and the casing, means to admit power fluid to the motor and then into said mixing chamber, means to admit said fluid directly into said mixing chamber, means to admit water directly into said mixing chamber, and means including said soap passage to admit soap from the soap chamber into contact with the water before it reaches the mixing chamber, said soap being sucked out by the vacuum action of the water passing the mouth of the soap passage.

3. A washing device which comprises a casing, a fluid motor therein, a rotatable annular element operatively connected to the motor and rotatably sealed against the bottom of the casing, a brush plate detachably connected to said annular element and closing the bottom thereof, a nozzle in said brush plate, the space above the brush plate and below the bottom of the casing forming a mixing chamber, a valve block in the casing, a soap chamber in said casing, a water valve in said block, a soap valve in said block, an air valve in said block, hand grips on said casing, finger-manipulable elements connected to said valves and manipulable by the operator's fingers without removing the hands from the grips, means including the water valve to admit a stream of water directly to said mixing chamber, means including the soap valve to admit soap from the soap chamber directly into the water stream before it reaches the mixing chamber, means including the air valve to admit air to the motor and means to exhaust the air from the motor into the water stream, and means including the air valve to admit air directly into the water stream and by-pass the motor when desired.

4. A washing device which comprises a casing, a fluid motor in said casing, a soap chamber therein, a brush rotatably connected to said motor, a nozzle coupled to said brush, a mixing chamber leading to said nozzle, an inlet passage in said casing and leading to said mixing chamber, means to admit power fluid to the motor and then into said inlet passage, means to admit said fluid directly into said inlet passage, means to admit water directly into said inlet passage, and passage means to admit soap from the soap chamber into contact with the water and fluid in said inlet passage, whereby said soap is sucked out by the vacuum action of the water and fluid passing the mouth of the soap passage.

5. A washing device which comprises a casing, a fluid motor therein having a drive shaft, an annular ring element rotatably sealed against the bottom of the casing concentric with said shaft, a brush plate connected to said ring element and closing the bottom thereof, a spider mounted on said drive shaft for rotation therewith and connected to said ring element, a nozzle in said brush plate, and means for conveying fluid to a mixing chamber communicating with the nozzle bounded by said ring, said brush plate and said casing whereby said fluid is agitated by said spider before discharging through said nozzle, a soap chamber in said casing, a valve block in said casing, a water valve in said block, a soap valve in said block, an air valve in said block, hand grips on said casing, finger manipulable elements connected to said valves and manipulable by the operator's fingers without removing the hands from the grips, said means for conveying fluid to said mixing chamber comprising means including the water valve to admit a stream of water directly thereto, means including the soap valve to admit soap directly into the water stream before it reaches said mixing chamber, means including the air valve to admit air to the motor and means to exhaust the air from the motor into the water stream, and means including the air valve to admit air directly into the water stream and by-pass the motor.

MELVILLE SEARS.

References Cited in the file of this patent

UNITED STATES PATENTS

| Number | Name | Date |
|---|---|---|
| 901,272 | Willis | Oct. 13, 1908 |
| 963,477 | Service et al. | July 5, 1910 |
| 1,055,572 | Thompson | Mar. 11, 1913 |
| 1,217,597 | Hecht et al. | Feb. 27, 1917 |
| 1,231,825 | Weller | July 3, 1917 |
| 1,469,077 | Foster | Sept. 25, 1923 |
| 1,673,228 | Cantrell | June 12, 1928 |
| 1,679,323 | Mortlock | July 31, 1928 |
| 1,691,524 | Maycen | Nov. 13, 1928 |
| 1,881,129 | Peek et al. | Oct. 4, 1932 |
| 1,928,246 | Brinker | Sept. 26, 1933 |
| 1,948,815 | Gruendel | Feb. 27, 1934 |
| 2,019,705 | Hubert | Nov. 5, 1935 |
| 2,384,458 | Dubay | Sept. 11, 1945 |
| 2,468,929 | Holt et al. | May 3, 1949 |

FOREIGN PATENTS

| Number | Country | Date |
|---|---|---|
| 141,493 | Switzerland | Oct. 1, 1930 |
| 695,604 | Germany | Aug. 29, 1940 |